United States Patent Office 3,478,649
Patented Nov. 18, 1969

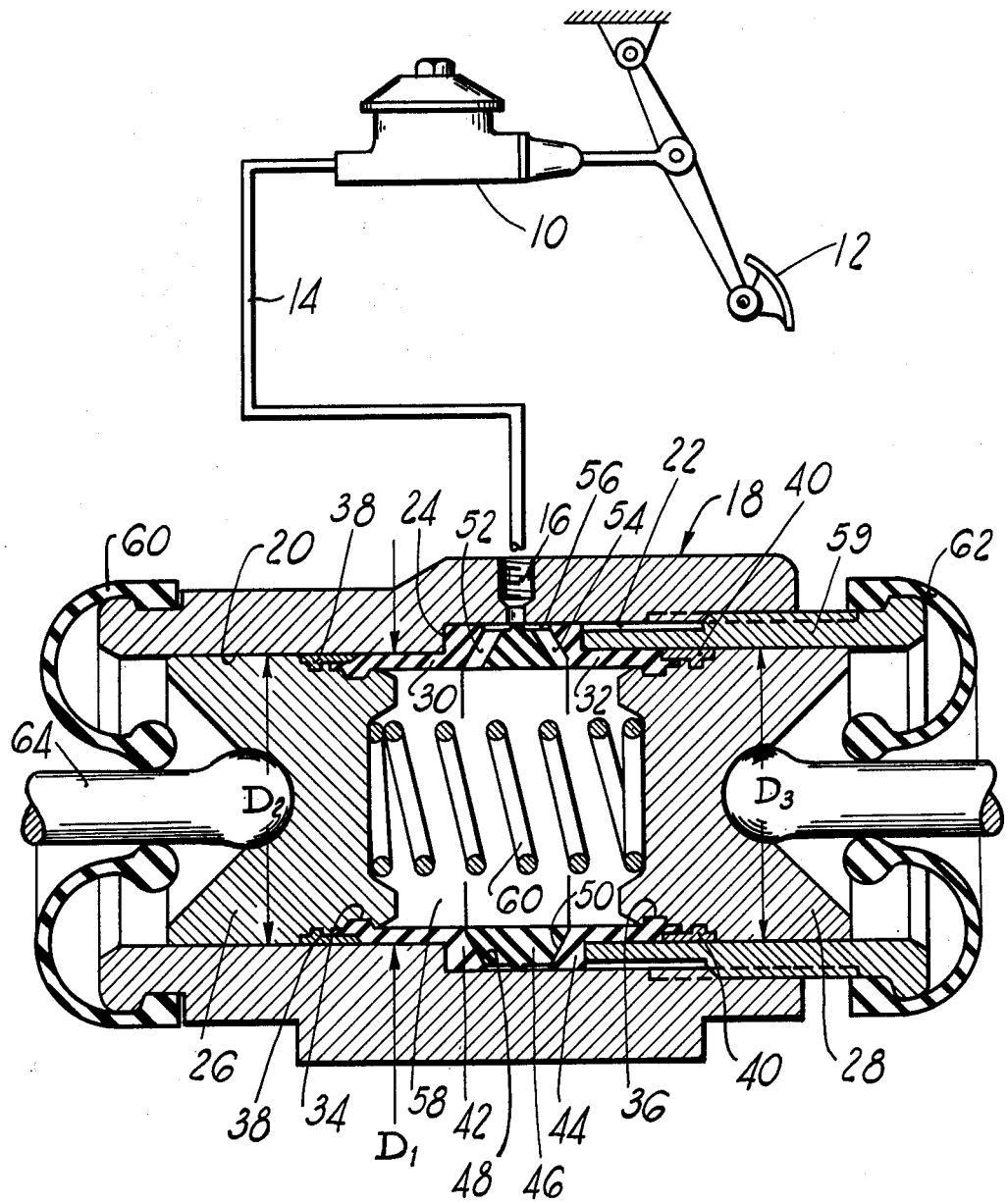

3,478,649
SEALED WHEEL CYLINDER
Richard L. Lewis, St. Joseph, Mich., assignor to The Bendix Corporation, a corporation of Delaware
Filed Aug. 3, 1967, Ser. No. 658,071
Int. Cl. F01b 19/04; F16j 3/00; F15b 7/08
U.S. Cl. 92—50                                    2 Claims

ABSTRACT OF THE DISCLOSURE

A wheel cylinder having annular stretching diaphragms secured to the periphery of pistons slidable within the housing. The diaphragms can stretch to permit operation of the pistons and upon return do not restrict the bore diameter in that the stretching diaphragms as assembled within the housing are preloaded to exert a radially outward force.

Summary

Sealed hydraulic actuators and motors have long been the subject for improvement. Examples of the state of the art can be found in Patent Nos. 1,857,413; 2,046,140; 2,178,490; 2,192,012; 3,032,997, and 3,319,533.

These patents have recognized the problem of such systems but have approached it in quite different ways. For example, since the earliest of these attempts, as may be perhaps found in the teachings of the U.S. Patent No. 1,857,413 it has been thought that the elongation of a contained diaphragm or the like would not interfere with the operation of the motor it is in. Patent No. 2,178,940 teaches a folding diaphragm approach to reduce fatigue caused by stretching diaphragms of such motors, and Patent No. 2,192,012 teaches shaping of the diaphragm and related pistons to reduce resistance to operation caused by elongation.

However, the net result of this prior art is found, as in the more current patent, to teach that in such systems the practitioner must expect elongation and bulging. Therefore, it must be realized that there will be a tendency to stretch the diaphragms whereby they will lie away from the cylinder walls in the state of rest. This means that upon reapplication of pressure a given volume of hydraulic fluid displacement will be required to move the diaphragm outwardly before work can be done creating a loss in displacement. If, as in a hydraulic brake system, displacement requirements are critical, these prior art systems have serious disadvantages.

The principal object of this invention is to provide such a sealed motor as found in the prior art which has a diaphragm that does not reduce to a diameter below the diameter of the housing bore.

Drawing description

The drawing illustrates in cross section form a wheel cylinder for a vehicle brake embodying the principles of this invention with a schematic illustration of how a master cylinder is in communication therewith.

Detailed description

In more detail, there is shown a master cylinder 10 actuated by a pedal 12 for developing a fluid pressure in conduit 14 that is introduced, as at 16 into the wheel cylinder housing 18. The wheel cylinder housing 18 is manufactured to have a small diameter bore 20 and a large diameter bore 22 with a shoulder 24 therebetween.

The actuating mechanism within the wheel cylinder housing 18 comprises pistons 26 and 28. Stretching diaphragms in the form of annular rubber members 30 and 32 are affixed to the rear faces of the pistons 26 and 28 by snap fitting beads 34 and 36 into grooves adjacent the rear face of these pistons and placing thereover clamping rings 38 and 40. To insure this attachment the beads 34 and 36 are bonded within the grooves of the pistons 26 and 28 under the clamping rings 38 and 40, if desired. Both of the stretching diaphragms 30 and 32 have an exterior diameter $D_1$ which, prior to assembly within the housing 18, is of a greater dimension than the diameter $D_2$ of the smaller portion 20 of the stepped bore within the housing 18 of the wheel cylinder.

The diaphragms terminate toward the center of the housing 18 into beads 42 and 44, and a spacer 46 having converging sides 48 and 50 for abutting facing sides of beads 42 and 44 is placed between the stretching diaphragms 30 and 32. The annular spacer 46 is provided with passages 52 and 54 which communicate inlet chamber 56 from the fluid inlet 16 to the actuating chamber 58.

Prior to abutting the bead 44 onto the side 50 of the spacer 46 a spring 60 is placed between the pistons 26 and 28. Thereafter the piston 28 and its rearwardly projecting resilient member 32 is placed against the spacer on the side 50 and a sleeve nut 59 is threaded into the large diameter opening for the portion 22 of the stepped bore of the housing 18 to clamp the beads 42 and 44 between the sleeve nut 59 and the shoulder 24. The wheel cylinder assembly is then completed by attaching the boots 60 and 62 to the end of the housing and the sleeve nut, respectively, and brake actuating rods 64 are abuttingly related to the pistons 26 and 28 upon assembly of the wheel cylinder housing 18 to the backing plate structure of the vehicle brake (not shown).

The inside diameter $D_3$ of the sleeve nut 59 is equal to the diameter $D_2$ of the smaller portion 20 of the stepped bore so that the pistons 26 and 28 have an equal effective area within the wheel cylinder housing 18.

By utilizing diaphragms 30 and 32 whose external diameter $D_1$ provides a controlled amount of bore interference on the cylindrical outside diameter $D_2$ and $D_3$, there will be a limited amount of radial compression of the sidewalls of the diaphragms 30 and 32. This will mean that, as the pistons 26 and 28 are caused to be moved outwardly by the communication of a fluid pressure developed by a master cylinder 10 to the chamber 58, the diaphragms 30 and 32 will stretch to increase this radial compression of the sidewalls of the diaphragms 30 and 32.

Upon relief of the actuating pressure, as by release of the brake pedal 12 to permit return flow from the chamber 58 to the master cylinder 10, the resiliency of the rubber diaphragms 30 and 32 will pull the pistons 26 and 28 back to their released attitude, i.e., until the spring 60 is slightly compressed within the chamber 58. In this position there will remain, because of the bore interference aforementioned, some radial compression in the sidewalls of the diaphragms 30 and 32 so that they will not sag into the chamber 58 throughout the life of the wheel cylinder. Thus, there will be no gas pockets or voids between the exterior diameter of the diaphragms 30 and 32 and the inner walls of the smaller portion 20 of the stepped bore or that of the sleeve nut 59. Thus, there will not be any fluid displacement requirement upon reapplication of the brakes in order to bring the diaphragms 30 and 32 against the sidewalls before the pistons 26 and 28 may be actuated.

Having described an operative construction with its advantages, it is now desired to set forth the protection sought by these Letters Patent by the appended claims:

I claim:
1. In a hydraulic motor:
   a housing defining a chamber therewithin;
   said chamber being stepped to present larger and smaller diameter portions with a shoulder therebetween;

said larger portion receiving an annular nut having an internal diameter substantially equal to the diameter of said smaller portion;

first and second piston means slidably engaged with the internal diameter of the nut and the said smaller diameter portion respectively;

a pair of annular resilient diaphragms extending axially along said internal diameter of said nut and along said smaller portion respectively and being radially expanded to forcibly engage the nut and the smaller portions;

one end of each of said diaphragms being secured in a groove formed in said first and second piston means respectively, said groove being formed on the periphery of said piston means adjacent their inner end portions;

a bead projecting from the other end of each of said diaphragms; and an annular spacer in said chamber interposed between said beads to maintain the latter in engagement with said shoulder and nut respectively.

2. The invention of claim 1; and fluid inlet means extending through said housing;

said spacer cooperating with said housing to provide a fluid inlet cavity sealed by said beads;

there being passages through said spacer to admit fluid to said chamber.

References Cited

UNITED STATES PATENTS

| | | | |
|---|---|---|---|
| 1,912,218 | 5/1933 | Pentz | 92—50 |
| 1,998,094 | 4/1935 | Pentz | 92—50 |
| 2,022,254 | 11/1935 | Pentz. | |
| 2,089,471 | 8/1937 | Geyer | 92—50 X |
| 2,140,778 | 12/1938 | White. | |
| 2,212,246 | 8/1940 | Pierce et al. | 92—50 X |
| 2,612,419 | 9/1952 | Reynolds | 92—50 X |

FOREIGN PATENTS 975,545    10/1950    France.

EDGAR W. GEOGHEGAN, Primary Examiner

IRWIN C. COHEN, Assistant Examiner

60—54.6; 92—99

U.S. Cl. X.R.